United States Patent [19]

Wyatt

[11] Patent Number: 4,982,722
[45] Date of Patent: Jan. 8, 1991

[54] HEAT RETENTIVE SERVER WITH PHASE CHANGE CORE

[75] Inventor: W. Burk Wyatt, Brentwood, Tenn.

[73] Assignee: Aladdin Synergetics, Inc., Nashville, Tenn.

[21] Appl. No.: 361,943

[22] Filed: Jun. 6, 1989

[51] Int. Cl.[5] ............................................... F24J 2/40
[52] U.S. Cl. ..................................... 126/400; 126/246; 220/427
[58] Field of Search ............... 126/246, 375, 400, 390; 220/426, 427, 428

[56] References Cited

U.S. PATENT DOCUMENTS

| | | |
|---|---|---|
| 1,049,385 | 1/1913 | Mohrenwitz . |
| 1,370,722 | 3/1921 | Adam . |
| 3,034,499 | 5/1962 | Scavullo . |
| 3,054,395 | 9/1962 | Torino . |
| 3,118,560 | 1/1964 | Cornelius . |
| 3,148,676 | 9/1964 | Truog et al. . |
| 3,383,880 | 5/1968 | Peters . |
| 3,387,650 | 6/1968 | Hoffman et al. . |
| 3,463,140 | 8/1969 | Rollor, Jr. . |
| 3,463,161 | 8/1969 | Andreassy . |
| 3,557,774 | 1/1971 | Kreis ..................................... 126/246 |
| 3,603,106 | 9/1971 | Rayan et al. . |
| 3,766,975 | 10/1973 | Todd . |
| 3,875,370 | 4/1975 | Williams ............................... 126/246 |
| 4,077,390 | 3/1978 | Stanley et al. . |
| 4,086,907 | 5/1978 | Rothschild . |
| 4,246,884 | 1/1981 | Vandas ................................. 126/246 |
| 4,287,943 | 9/1981 | Hotta . |
| 4,319,629 | 3/1982 | Hotta . |
| 4,398,593 | 8/1983 | Casinelli . |
| 4,505,252 | 3/1985 | Wada et al. . |
| 4,530,344 | 7/1985 | Iyengar et al. . |
| 4,567,877 | 2/1986 | Sepahpur ............................. 126/246 |
| 4,672,178 | 6/1987 | Wada et al. . |
| 4,777,930 | 10/1988 | Hartz . |
| 4,777,931 | 10/1988 | Ziegler et al. ........................ 126/246 |

Primary Examiner—Carroll B. Dority
Attorney, Agent, or Firm—Banner, Birch, McKie & Beckett

[57] ABSTRACT

A heat retentive server, in particular a server base, for maintaining food or beverage in a desired temperature range for a period of time includes a non-metallic upper shell and lower shell which sealingly form a cavity between their inwardly facing surfaces. A heat storage member including an encapsulated core of phase change material is disposed in the cavity. As the server base is heated, the phase change material melts and stores heat as heat of fusion. When the core later cools, it undergoes a phase change from the liquid state to the solid state an imparts the stored heat to the server base.

59 Claims, 4 Drawing Sheets

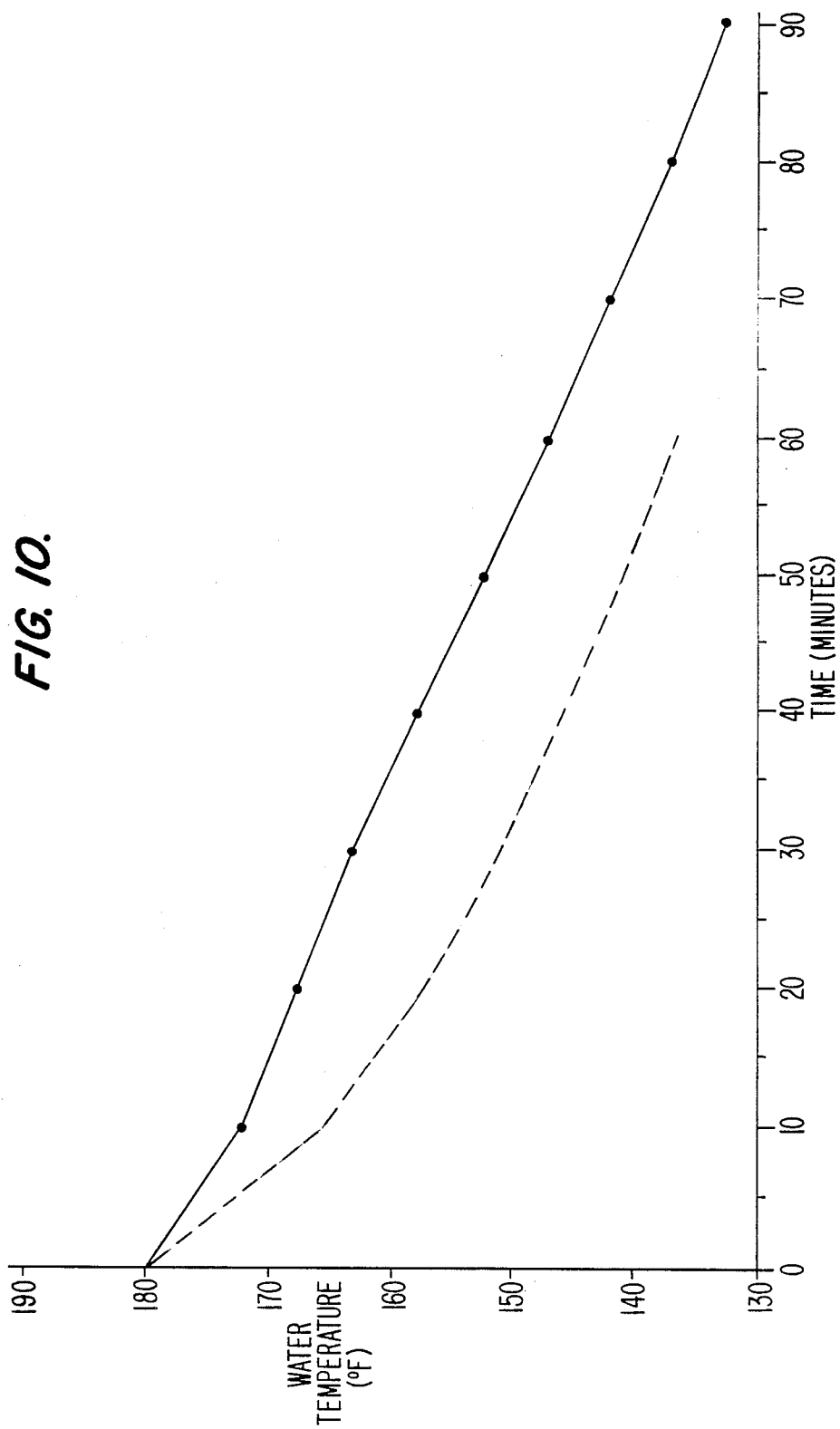

HEAT RETENTIVE SERVER WITH PHASE CHANGE CORE

TECHNICAL FIELD

The present invention generally relates to devices for keeping items, such as food serving dishware and food thereon warm prior to serving, and more particularly, to a heat storing type of server base or dome and a method of making the server base or dome.

BACKGROUND OF THE INVENTION

Heat retentive servers are commonly used in hotels, institutional environments such as hospitals and nursing homes, and like operations to keep food warm prior to serving. Frequently there are substantial delays between the time the food is removed from the oven and the time it is actually served. Such delays may, for example, commonly exceed thirty minutes by which time the food is cold. Accordingly, various devices for keeping food warm until it can be served have been commercially available and have been suggested in prior art literature. Heat retentive servers generally include a server base and a dome for such base. One or both of the base and dome is typically insulated so that food held between the base and dome will stay warm for a desired time period. When the server base is designed to support dishware, which in turn holds food, such a base is referred to as a pellet base and the entire system, i.e., base, dome and plate, is referred to as a pellet system. Prior art server bases and domes have also been designed to include heat retention mediums such as solid heat sinks. When a heat sink is incorporated into a server base and the base supports a food carrying plate, the base can be referred to as a plate warmer.

Prior art plate warming devices, which include a heat storage server base or dome having a heat sink disposed between the upper and lower walls of the base or dome, have taken into account special considerations. More specifically, in use, the heat storage base or dome is initially heated to store heat in the heat sink, and thereafter, when a plate of food is placed on the heat storage base or under the heat storage cover, the plate and food are kept warm by the heat passively released from the heat storage sink. In such devices, the sink is generally formed of a solid metal. The size of the sink is thus limited and generally occupies only a portion of the interior space of the base or dome. The air trapped in the remaining space between the base or dome walls expands when the base or dome is heated, so that means must also be provided to relieve the internal pressure in the base or dome resulting from air expansion and thereby prevent the base or dome from bursting.

One prior art structure directed to this air expansion problem is disclosed in U.S. Pat. No. 3,557,774. In the '774 patent, the bottom wall of the heat storage server base includes an elevated annular wall portion which is deformable as the air in the space between the walls expands. However, one disadvantage of the base is that it requires a complex bottom wall, which requires complicated fabrication and assembly, and therefore is not particularly suited for mass production.

Another attempt to resolve the air expansion problem may be found in U.S. Pat. No. 4,086,907 which includes indents or corrugations in a concave bottom base wall to permit expansion or deformation of the bottom wall, and thus, prevent the base from bursting should the base be overheated. However, the device not only suffers from the disadvantage of requiring relatively complicated fabrication and assembly, the construction itself presents certain problems during use. For example, the concave configuration of the base portion provides substantial resistance to expansion under normal conditions. The spot welds which secure channel members extending through slots in a metal heat sink to the bottom side of the top wall are susceptible to breakage due to heat stress over continued recycling.

Another disadvantage of servers which use metal heat sinks is that because of the relatively high thermal conductivity of metals such as aluminum, the heat storage base or cover, when heated to a relatively low temperature, for example, 230° F., is limited with respect to the amount of time it is effective to keep food warm. Although the heat storing server may be initially heated to a relatively high temperature, i.e., in excess of 350° F., to store sufficient energy in the metal heat sink to keep food warm for an appreciable period of time, this, of course, increases the inherent risk in handling such servers and increases the risk that the server may burst. Also, while the heat sink can be increased in size to store more heat, the physical size and weight limitations for devices of this type generally do not permit increasing the size of the heat sink.

U.S. Pat. No. 3,148,676 discloses a food warming device wherein the metal heat sink is replaced by a phase change material such as a wax or asphalt substance having a relatively high specific heat and a relatively low melting point, e.g., between 180° and 270° F. The substance may be a wax such as carnauba wax, Cornox wax or a synthetic hardened microcrystalline wax, and stores a relatively large amount of heat energy which is gradually released at a rate which is much less than the rate at which it was stored. The substance fills a chamber between the top and bottom walls of the unit and is retained within a honeycomb framework which is fabricated from aluminum or the like to form a multiplicity of relatively small, closely spaced cavities in the chamber. Expansion of the substance is accommodated by a pair of spaced circular lines of weakness in the annular recessed portion of the top wall which provide relief means for preventing the unit from bursting in the event that excess pressure is developed in the chamber. This unit, thus, also requires relatively complicated fabrication and assembly.

Fabrication of units utilizing heat storing substances, such as those disclosed in U.S. Pat. No. 3,148,676, is also difficult because the heat storing substance is not readily insertable into the unit in its solidified state where, for example, a honeycomb framework or the like is required. The honeycomb framework has an open top and bottom. If the substance is first melted for insertion into the honeycomb framework, the substance must be allowed to cool within the partially assembled server before further fabrication or assembly can be undertaken. Since one advantage of the heat storing substance is its capacity for heat retention for long periods of time, it is some time before the substance has cooled sufficiently to permit further work. Moreover, if the melted substance is injected into the device, the injection hole must be sealed, such as by soldering, and if the hole is improperly sealed, the seal may rupture due to expansion of the heat storing substance during use, allowing the substance to leak from the device or allowing water or air to migrate into the chamber. In either case, mass production of such units is restricted.

Further prior art efforts to solve the aforementioned problems still suffer from other disadvantages. For example, U.S. Pat. No. 4,246,884 discloses a plate warmer including a stainless steel outer shell having an inwardly concave top wall and an opposing inwardly concave bottom wall joined thereto by an interconnecting peripheral side wall. The top and bottom walls form an airtight cavity which contains heat storing material, and more particularly, phase change material. The plate warmers are heated in a stacked relationship with feet on the bottom surface of the shell spacing the plate warmers apart to allow convective air flow between adjacent plate warmers. The top and bottom outer shell walls are adapted to assume substantially flat configurations to accommodate expansion of the core material when the core is heated, and to reassume their inwardly concave configurations when the core is cool. Accordingly, the outer shell members are fabricated from material sufficiently flexible to react to core expansion. More specifically, the outer shell members are fabricated from relatively thin stainless steel sheet material so that when the core is heated, it may expand by forcing the concave walls apart to assume a substantially flat configuration, and therefore, additional pressure relief means is not required. However, the heat storing core must be separately formed in a compression mold having inwardly concave molding surfaces so that the core may be molded to fit between the outer shell members which are pressed to have complementary concave surfaces. Such shaping makes fabrication and assembly somewhat complicated. In addition, the metal, i.e., stainless steel, outer shells have a relatively high heat capacity and conductivity. Consequently, the shells retain heat and are difficult to handle when heated to serving temperatures. Also, since the wax core is not encapsulated, hot wax leakage could occur along the seams of the stainless steel.

Attempts to resolve the handling problem of hot metal shells have included the use of suction cup devices or insulated gloves to prevent the user's bare hands from directly contacting the hot shell. Still other attempts have included attaching a support plate of relatively low thermally conductive materials, such as plastic, under the metal shell, thereby permitting indirect handling of the hot shell.

SUMMARY OF THE INVENTION

In view of the above and other deficiencies of the known prior art, it is an object of the present invention to provide a heat retentive server including a server base made from non-metallic material having a relatively low thermal conductivity, such as plastic, so that the server may be handled with bare hands.

It is another object of the present invention to provide a non-metallic heat retentive server with a core of phase change material which will impart additional BTUs to the server when changing from liquid to solid state, wherein the relatively low thermal conductivity of the non-metallic material increases core heat retention, thereby reducing the amount of core material necessary to maintain the server in the desired temperature range for a predetermined period of time.

It is a further object of the present invention to provide a heat retentive server with a non-metallic server base which is made from a material wherein chemical resistance, structural integrity and processing characteristics are optimized.

It is yet another object of the present invention to provide a heat retentive server with a non-metallic, light weight, but impact resistant, server base to permit easier handling and reduce fatigue on food service delivery personnel.

It is yet a further object of the present invention to provide a heat retentive server with a doubly enclosed core of phase change material so that the material, when in the liquid state, will not leak to the outer portions of the server, thereby improving safety and reliability to food service personnel and the consumer.

It is still another object of the present invention to provide a heat retentive server with a doubly enclosed core of phase change material so that the material will not leak from the server and drip therefrom, for example, onto other servers stacked thereunder, when heating a plurality of servers to the desired serving temperature.

It is still a further object of the present invention to provide a heat retentive server with an encapsulated core of phase change material in a simplified double casing construction with improved manufacturing efficiencies.

It is yet another object of the present invention to provide a heat retentive server with a core of phase change material which is encapsulated in a flexible casing which permits thermal expansion of the core.

It is still another object of the present invention to provide a heat retentive server with a centering mechanism so that the encapsulated core of phase change material may be easily centered in the shells of the server during assembly and maintained centered when the core undergoes thermal expansion so that an even distribution of heat flows to the upper shell support surface.

It is still a further object of the present invention to provide a method for making a heat retentive server that minimizes air entrapment in the encapsulated core thereby eliminating the need for a relatively thick wall of encapsulation which would otherwise be necessary to prevent the encapsulation from bulging or possibly rupturing due to excessive stress created by heat expansion of a relatively large volume of air in the core.

Thus, the present invention involves a server base for use in a heat retentive server system to maintain food or beverage in a desired temperature range for a period of time. The server base includes an upper shell and a lower shell which seal a cavity formed therebetween. A heat retention member including an encapsulated heat retention medium is disposed in the cavity. The medium being meltable, stores heat when heated toward and above its melting point, and releases heat through the upper shell to maintain food or beverage supported above the upper shell warm as it solidifies.

The method for making the server base having a cavity and a discrete phase change sealed core disposed therein includes the steps of forming a casing with an inlet port, supporting the casing with the inlet port directed upwardly, filling the casing by flowing phase change material in its liquid state downwardly through the inlet port, sealing off the inlet port so that the casing forms an encapsulation for the phase change material, placing the encapsulated core of phase change material in a recess formed in a first shell, assembling a second shell over the encapsulated phase change material and joining the first and second shells.

Other important features and advantages of the invention will be apparent from the following description and the accompanying drawings, wherein for purposes of illustration, only a specific form of the invention is shown in detail.

BRIEF DESCRIPTION OF THE DRAWINGS

FIG. 10 is a graph illustrating the heat retentive capability of a server base and dome in accordance with the present invention.

DETAILED DESCRIPTION OF THE PREFERRED EMBODIMENTS

Figure 1:
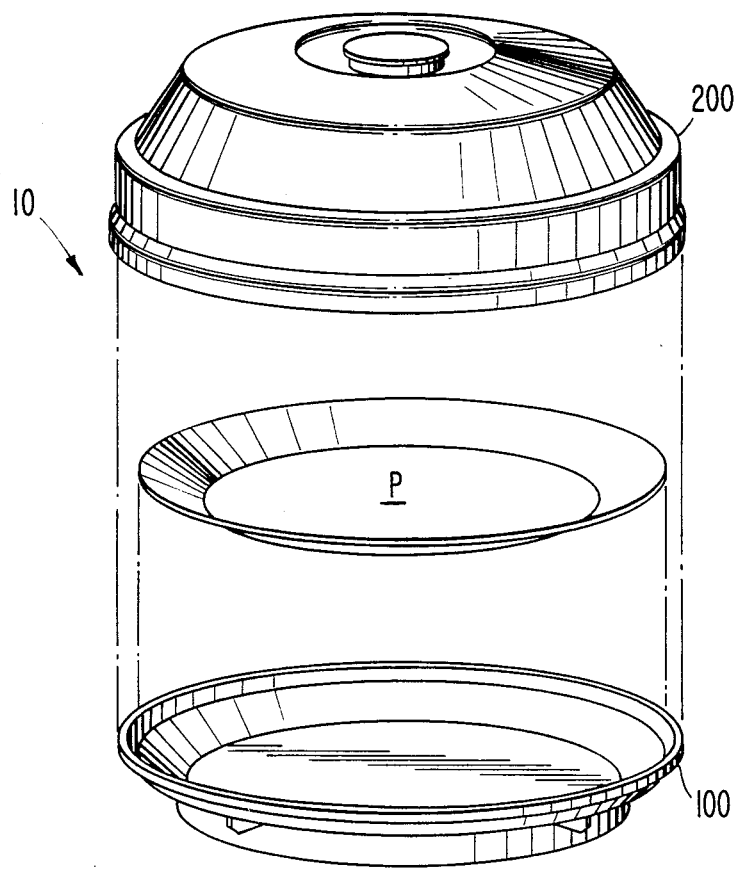
FIG. 1 is a perspective view of a heat retentive server in accordance with a preferred embodiment of the invention, illustrating a dome separated from a server base with a plate between the base and dome.

Referring to the drawings in detail, wherein like numerals indicate like elements, FIG. 1 shows a heat retentive server 10 in accordance with a preferred embodiment of the invention. Server 10 includes server server base 100 and dome 200. Since base 100 supports plate P, server 10 functions as a pellet meal delivery system. Furthermore, although server 10 is illustrated in a configuration for receiving a plate, such as a conventional 9 inch dinner plate, other shapes and sizes may be incorporated without departing from the scope of the invention. For example, base 100 may be configured in the shape of a bowl or a mug.

Figure 3:
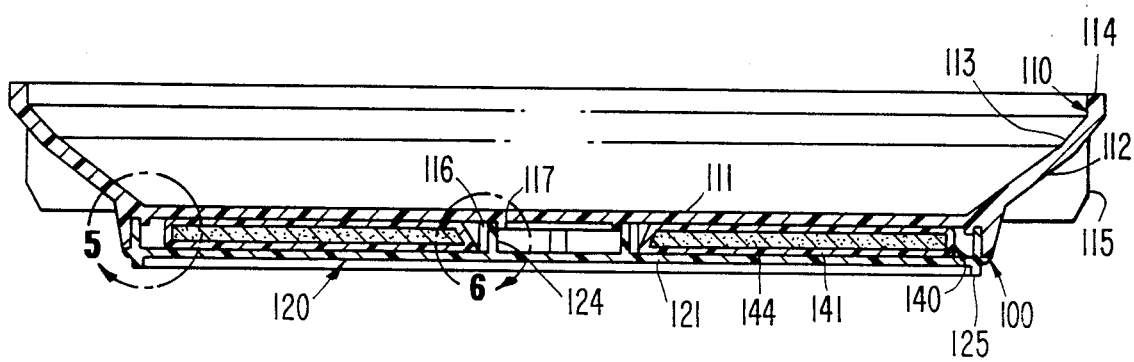
FIG. 3 is a cross-sectional view of the heat retentive server base showing the encapsulated core of phase change material.
Figure 4:
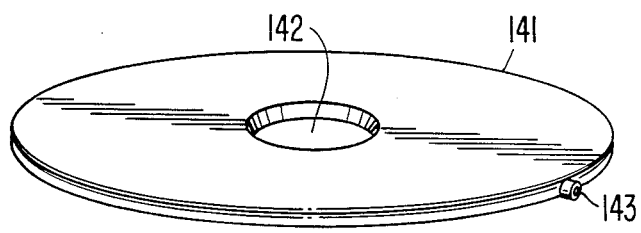
FIG. 4 is a perspective view of the casing which forms the encapsulation for the core of phase change material.

Referring to FIG. 3, base 100 includes upper shell 110 and lower shell 120 which hermetically seal cavity 130 formed therebetween. Heat retention or heat storage member 140 is disposed in cavity 130, and comprises casing 141 which encapsulates heat retention medium or heat storing core 144. Therefore, heat retention medium 144 is doubly enclosed by encapsulation casing 141, and then by shells 110 and 120. Casing 141 may have various configurations. However, a disc-like, circular or annular configuration, as illustrated in FIG. 4, is preferred when using a generally circular base to provide an even distribution of heat or uniform heat flow through central wall 111 of upper shell 110.

Heat retention medium 144 fills substantially the entire encapsulation casing 141 and serves to store heat when server base 100 is initially heated, and then releases the stored heat through upper shell 110 for an extended period of time as base 100 is allowed to cool. Heat retention medium 144 should be non-toxic and is preferably a synthetic petroleum wax material. A preferred material is synthetic paraffin manufactured by the Shell Company under the name of SHELL MAX 400. This material has a melting temperature of about 177° F., a specific heat of 1.3 to 1.4 calories/°C./gram from its melting point to 71° F. below the melting point, 0.7 calories/°C./gram at 70° F. to 90° F. below the melting point and 0.5 calories/°C./gram at 90° F. to 125° F. below the melting point, and a heat of fusion of about 40 calories/gram. It is preferred that the phase change material have a melting point below 200° F. so that the material can be melted and base 100 can be maintained at a temperature that can be handled with bare hands. It is also preferred that the phase change material have a relatively high specific heat, e.g., between 1 and 1.5 calories/°C./gram at the melting point of the material. While paraffin is a preferred phase change material due to its relatively low melting point, other phase change materials such as salt hydrate or crystalline alkyl hydrocarbons could be used. When the phase change material is heated above its melting temperature, a relatively large amount of heat, i.e., heat of fusion, is stored therein as the material melts from its solid state to its liquid state. Thereafter, when the phase change material is allowed to cool, the material undergoes a phase change from the liquid state to the solid state, and the heat energy stored in the material is gradually released. Typically, a phase change material in and of itself releases its stored heat energy at a rate which is much less than the rate at which it was stored. Thus, a substantial amount of heat is available for release to the dishware to keep the food thereon warm for a relatively long period of time, e.g., in excess of 60 minutes.

Figure 5:
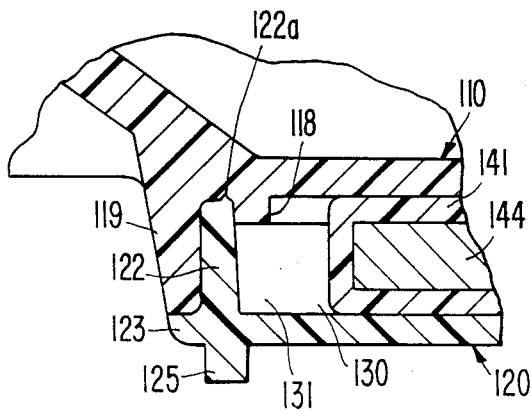
FIG. 5 is an enlarged cross-sectional view of a portion of the heat retentive server base within the area defined by line 5 in FIG. 3.
Figure 6:
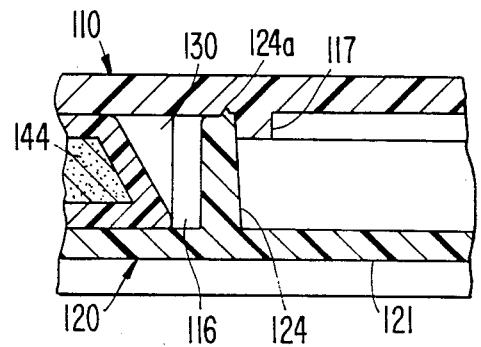
FIG. 6 is an enlarged cross-sectional view of a portion of the heat retentive server base within the area defined by line 6 in FIG. 3.

Upper shell 110 comprises generally flat central wall 111 for supporting dishware and inclined or frustoconical side wall 112 which extends upwardly and outwardly away from central wall 111. Side wall 112 includes spacer support portion 113 which terminates in ledge portion 114, and is configured to receive and support annular stepped seating portion 211 of dome 200. Upper shell 110 further includes annular projections 116 and 117 extending from a central portion of central wall 111 and forming a groove therebetween for receiving annular projection 124 extending from a central portion of central wall 121 of lower shell 120. As best seen in FIG. 6, the upper end of annular projection 124 has an energy director tip 124a. Projections 116, 117 and 124 form a centering mechanism for centering encapsulated heat retention member 140 during assembly and maintaining the same centered when the phase change material and casing 141 undergo thermal expansion so that an even distribution of heat flows through a central portion of upper shell wall 111 and the food being served. Referring to FIGS. 3, 4 and 6, projection 116 is inserted through hole 142 formed in encapsulation casing 141. As can be seen while viewing FIGS. 3 and 5, the encapsulated phase change material may uniformly radially expand into expansion space 131 of cavity 130 due to projections 116, 117 and 124 maintaining the encapsulated core centrally disposed in cavity 130.

Upper shell 110 further includes annular projection 118 and annular lip 119 adjacent its periphery, which form a groove therebetween for receiving annular ridge 122, which extends from lower shell 120, to seal the heat retention storage member in cavity 130. Accordingly, annular ridge 122 is disposed radially outwardly from heat retention/storage member 140. An energy director tip 122a is formed at the upper end of annular ridge 122. Lower shell 120 further includes annular shelf 123 extending radially outwardly from annular ridge 122. Annular lip 119 overlaps annular ridge 122 and abuts shelf 123 to further seal heat retention member 140 in cavity 130, while supporting upper shell 110 on lower shell 120. Lower shell 120 further includes support ring 125 for supporting generally flat central wall 121, which supports the encapsulated phase change material, above the surface upon which server base 100 rests when in use. Alternatively, other support mechanisms may be used which are functional equivalents of ring 125. Ring 125 is located so that the center of ring 125 aligns with energy director tip 122a. Ring 125 thus can be used to align an ultrasonic welding horn with energy director tip 122a.

Annular ridge 122 is preferably joined or fused in the groove formed between projection 118 and lip 119 and to lip 119 by ultrasonic welding, thereby hermetically sealing cavity 130. FIGS. 5 and 6 illustrate shells 110 and 120 prior to the ultrasonic welding process wherein energy director tips 112a and 124a are present in their original, molded condition. During welding, tip 122a melts and flows downward by capillary action between the contacting surfaces of ridge 122 and projection 118 to form a fused connection. Similarly, during welding, tip 124a melts and flows downward by capillary action between contacting surfaces of projections 124 and 117 to form a fused connection.

Shells 110 and 120 are made from non-metallic material, preferably plastic, to reduce handling weight of the pellet delivery system and to enable the user to handle the base with bare hands due to the relatively low thermal conductivity of the plastic or other non-metallic material. Furthermore, the material must be capable of withstanding elevated temperatures, since base 100 is repeatedly heated during melting of the phase change material and during cleaning cycles. That is, base 100 must withstand heating on the order of 240° F. to melt the phase change material, for about 90 minutes, three times a day without breakdown, such as cracking or weld failure. The base also will be subject to repeated washing at temperatures which also may exceed 200° F.

Liquid crystal polymers are suitable in such an environment but they are not economically feasible. To this end, glass filled plastic, such as glass filled nylon, has been found to be a cost effective material for preventing breakdown of the shells. Nylon not only is about as chemical resistant as polypropylene, it can withstand environments with higher temperatures than polypropylene. Furthermore, even though nylon in itself is chemical resistant and withstands relatively high temperatures without physical breakdown which may be in the form of stress cracks or weld failure, the addition of glass to the nylon improves its chemical and heat resistance as well as its stiffness. The stiffer glass filled nylon, for example, virtually eliminates warping and distortion. However, when the glass filled plastic comprises more than about 35 percent glass by weight, the shells, which are preferably injection molded, are difficult to mold as well as to weld. On the other hand, when the amount of glass is reduced to improve shell molding characteristics and weldability, the aforementioned advantages which result from its use are diminished. Furthermore, the form of the glass affects the characteristics of the glass filled nylon. Glass strands may cause stain producing highs and lows in the shell surface, i.e., a rough surface finish. On the other hand, milled glass fibers not only provide a smoother shell surface, which improves stain resistance, the milled fibers improve molding characteristics and weldability. Therefore, the plastic material preferably comprises milled glass fibers within the range of about 25 to about 35 percent by weight. However, when the glass fiber filled nylon comprises about 27 percent milled glass fibers by weight, chemical resistance, stain resistance, molding characteristics and weldability are optimized. Other glass filled plastics such as glass filled polysulfone and glass filled acetal could also be used.

Figure 7:
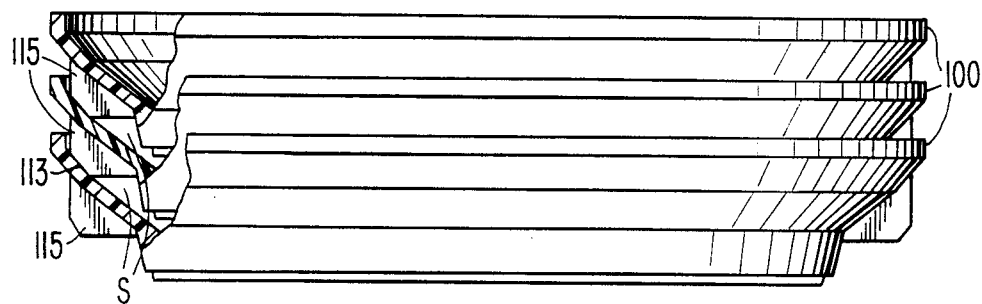
FIG. 7 is a partial cross-sectional view of a plurality of heat retentive server bases illustrating spacers which maintain the bases spaced when stacked one upon another.

Several server bases 100 may be stacked in an oven or other heating means and heated to a temperature sufficient to melt the heat storing material, preferably to about 240° F. when the heat storing material used is paraffin with a melting temperature of 177° F. To ensure that each server base 100 is uniformly heated such that core 144 melts, bases 100, as illustrated in FIG. 7, are stacked in spaced apart relation to permit convective air flow between the bases, thereby permitting convective in addition to conductive heat transfer to the phase change material. This is especially important due to the relatively low thermal conductivity of the plastic shells forming the base. To this end, fin-like spacers 115 are provided on and radially extend from the outer peripheral surface of upper shell side wall 112 to support each base above the underlying base and provide air space S for convective air flow between adjacent bases. To provide effective convection, the spacers are sized to maintain surfaces between adjacent bases spaced by at least ⅛ inch. Otherwise, it could take four to five hours to heat the base to the desired temperature wherein the phase change material inside the plastic would melt. It should be noted that other functional equivalents of fin-like spacers 15 may be used. However, the spacers preferably should be formed around the base circumference and not underneath lower shell central wall 121. The latter spacer position would deter from heat transfer efficiency through lower shell central wall 121 to core 144 as a result of increasing the wall thickness of portions of central wall 121 with spacers. This consideration is especially important when taking into account the already low heat conductivity of the plastic material used to form the shells. Furthermore, spacer support portion 113 of one base is configured to form a line contact with the corresponding portions of fin-like spacers 115 extending from a base stacked thereon. The line contact provides greater weight distribution than a point contact, thereby reducing surface wear.

Figure 2:
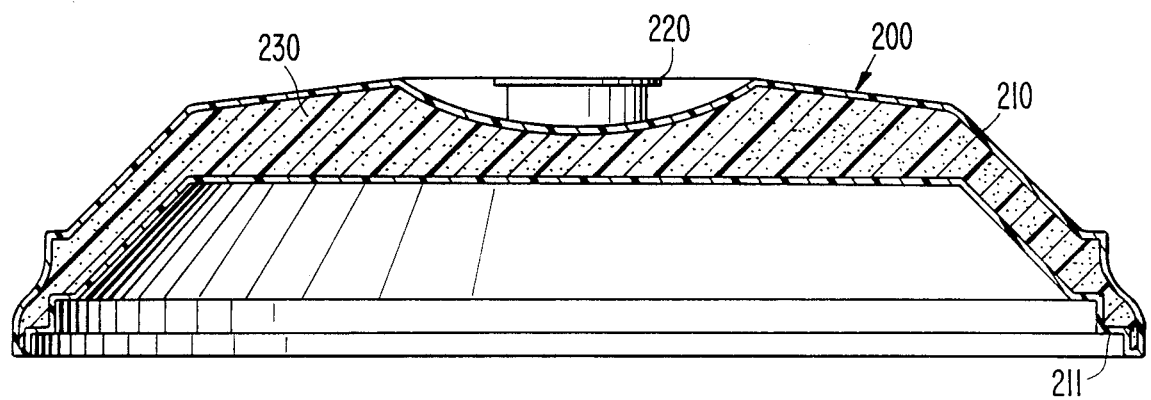
FIG. 2 is a cross-sectional view of the heat retentive dome depicted in FIG. 1.

After server base 100 is heated sufficiently to melt the phase change material, base 100 is removed from the heating oven and a heated plate having warm food thereon is placed on base 100. Insulating dome 200 then may be placed on a respective server base 100 to retain the heat from the base within the dome and thus help keep food warm. Referring to FIG. 2, dome 200 comprises shell 210, handle 220 and insulation 230 disposed within the space formed by shell 210. In a further embodiment depicted in FIG. 8, dome 200 may include heat retention/storage member 240. Member 240 comprises casing 241 and a heat retention medium 244. Casing 241 is blow molded to a shape following the contour of the interior of the dome and forms an encapsulation for heat retention medium 244, or more specifically a core of phase change material, such as paraffin.

As mentioned above, paraffin typically gives off heat in a gradual manner when it changes phase from a liquid to a solid. The gradual heat release of the paraffin in and of itself has the advantage of providing heat energy to the food plate over an extended time. This advantage is enhanced by having the paraffin encased in a low heat conductive plastic material, which further extends the heat transfer time to the food plate. A practical example of this extended heat transfer time is seen in the graph of FIG. 10. The graph compares the heat retention capability of two pellet systems. The test conditions used to generate the data for the graph simulate the food handling environment of a food delivery pellet system. That is, 6.5 ounces of water at a starting temperature of 180° F. are held in a container (simulating the food to be kept warm by the system). The container is placed on a heated server base and covered with an insulated server dome; and the temperature drop of the water is monitored.

The solid line in the graph illustrates the temperatures of the water supported on a server base in accordance with the present invention, wherein approximately 2 ounces of the encapsulated paraffin is enclosed in the server base and is completely melted. The dash-line on the graph illustrates the temperature of the water held on an unheated insulated plastic base without the phase change material and covered with an insulated dome. In food service, it is desirable to hold cooked food above 140° F. As seen in the graph, the system with the phase change material significantly improves the heat retention capability of the system. Referring to the solid line in the graph, it is seen that the slope of the line changes at approximately 10 minutes where the phase change of the paraffin begins to release energy to the system. As mentioned above, the tested system used 2 ounces of paraffin. If the amount of phase change material is increased, the amount of energy released to the system would increase, further flattening the slope of the temperature line. Furthermore, the combination of a paraffin enclosed in a low heat conductive material further enhances heat retention during use. In addition, what could be perceived as a disadvantage, i.e., the difficulty of melting the paraffin within the relatively low heat conductive plastic is alleviated by using the spacers, which allow convective in addition to conductive heating.

Figure 8:
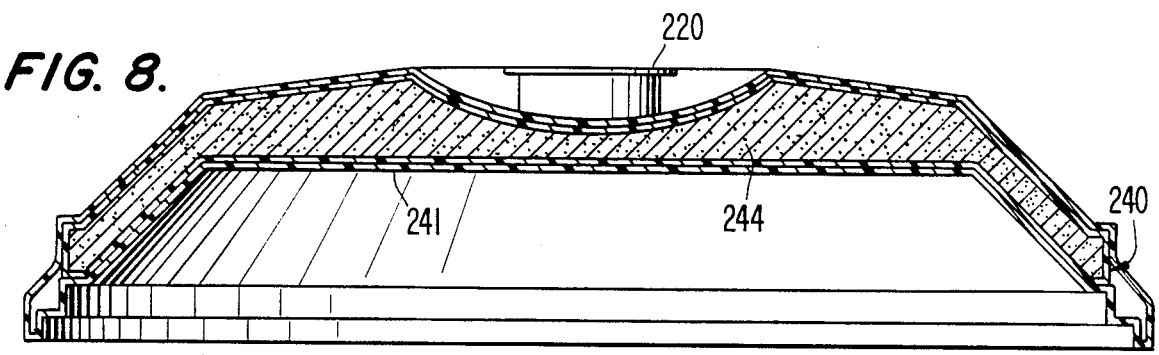
FIG. 8 is a cross-sectional view of a heat retentive dome in accordance with another embodiment of the invention.
Figure 9:
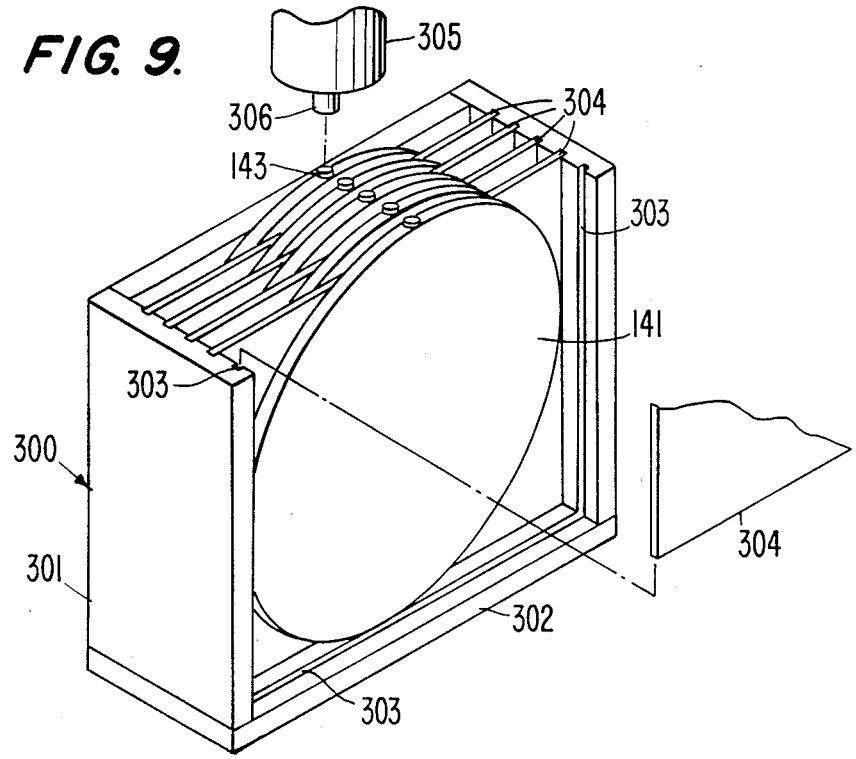
FIG. 9 is a perspective view of a fixture which supports a plurality of encapsulation casings for flowing phase change material therein.

Referring to FIGS. 8 and 9, fixture 300 is illustrated which may be used to fill casings 141 or 241 with phase change material such as paraffin wax. Casings 141 or 241, which may be blow molded and made from a polyolefin such as polypropylene, are disposed between plates 304 while maintaining inlet ports or nipples 143 directed upwardly. Polypropylene is an especially suitable casing material because it exhibits relatively high chemical resistance which could be important if the shells of the server base separate or crack to the extent of permitting chemicals to enter into cavity 130. Plates 304, which are made from a material that will not readily adhere to the casings, but which will permit rapid heat transfer to and from the casings and thus efficient heating or cooling thereof, such as metal, are slidable received in slots or grooves 303 formed in fixture side walls 301 and fixture bottom wall 302. The casings are heated either prior to their insertion into fixture 300 or thereafter to expand the casings, which are about six inches in diameter at their room temperature state, to their maximum diameter. The casings are then filled by sequentially flowing phase change material in its liquid state from injection device 305, through nozzle 306 and downwardly through inlet ports 143. Alternatively, a plurality of injection devices may be used or injection device 305 may be provided with a plurality of nozzles so that two or more casings may be filled simultaneously. The plates maintain the casing walls, which face the plates, susbtantially flat throughout the process.

The position of inlet ports 143 which permits the phase change material to flow downwardly as well as the fact that the casings are heated prior to filling minimize air entrapment in the encapsulated core. For example, the filling casings remain full as they cool and contract together with the phase change material, thereby minimizing air entrapment. A relatively large volume of trapped air could cause excessive bulging when subject to thermal expansion. In turn, such bulging could place excessive stress on the weld seams or the casing walls. As a result, the pressure developed in the thermally expanded air pockets could separate the welds which join the shells together, rupture the casing or both. Accordingly, the above described heating and filling procedure eliminates the need for a relatively thick wall of encapsulation which would otherwise be necessary to avoid bulging or even rupture due to excessive stress created by heat expansion of a relatively large volume of air in the core. The reduced wall thickness of a respective casing permits a commensurate reduction in the size of base cavity 130, thereby reducing the bulk of the server base, while improving handling efficiencies thereof. Furthermore, the thickness of a respective server base is limited by the fixed dimension of the base receiving slots or guides formed in standard base transport carts. Accordingly, if it was necessary to increase the casing wall thickness to respond to excessive air expansion, there would be less space in the casing to retain phase change material. As a result, heat storage and retention capacity would be reduced. However, when the casings are heated and then filled by the gravitational flow of phase change material as described above, air volume may be maintained below 2.5 percent of the core volume so that the casing wall thickness may be selected not to exceed 0.040 inches, thereby maximizing phase change material volume and thermal capacity.

After the casings are filled, the plates and casings may be alternatively removed when cool or concurrently removed when hot. It should be noted that the removable plates permit the casings to be removed before they cool off. In other words, when the casings have not yet cooled, the plates may be lifted and the casings in their thermally expanded state will go with them. However, if plates 304 were fixed in fixture 300, the expanded plates would be locked between the plates and in the fixture. Either before removal from the fixture or after removal therefrom, inlet ports 143 are sealed off so that the casing forms an encapsulation for the core of phase change material. When the inlet ports are in the form of nipples, as illustrated in FIGS. 4 and 9, a heater element may be introduced into a respective nipple to melt the inner wall thereof. Then mere pressure may be applied to the outer wall of the nipple to fuse the inner walls together and seal the same. Although the above heating and crimping method provides an effective seal, other methods of closing off the inlet port so that the casing forms an encapsulation for the phase change material may be used. For example, the nipple-type inlet port may be clamped to close the port while passing a heated blade through a transverse section of the nipple to fuse the inner walls thereof. After encapsulation, the cores of phase change material may be immediately assembled into the shells in the manner described above, or a plurality of cores can be stacked for subsequent assembly into the shells.

Having described the invention in detail, it will be recognized that the foregoing is considered illustrative only of the principles of the invention. Since numerous modifications and changes will readily occur to those skilled in the art, it is not desired to limit the invention to the exact construction, materials, assembly and so forth shown and described. Accordingly, all suitable modifications and equivalents may be resorted to the extent they fall within the scope of the invention and claims appended hereto.

I claim:

1. A server base for use in a heat retentive server to maintain food or beverage in a desired temperature range for a period of time, said server base comprising:
    an upper shell and a lower shell, said shells sealing a cavity formed therebetween; and
    a heat retention member disposed in said cavity, said heat retention member comprising an encapsulated heat retention medium, said medium being meltable to store heat therein when heated toward and above its melting point, and to release heat through said upper shell to maintain food or beverage supported above said upper shell warm as said melted heat retention material solidifies.

2. The server base of claim 1 wherein said heat retention medium comprises wax.

3. The server base of claim 1 wherein said heat retention member is disc shaped.

4. The server base of claim 1 including means disposed in said cavity for centering said encapsulated heat retention medium in said base and maintaining said medium centered in said base when said medium undergoes thermal expansion.

5. The server base of claim 4 wherein said centering means comprises an annular projection extending into said cavity, said projection extending through a hole formed in said encapsulated heat retention medium.

6. The server base of claim 5 wherein said projection and the periphery of said hole are substantially centered about the centroidal axis of said base and said heat retention member, respectively.

7. The server base of claim 1 wherein said upper shell includes an annular groove, said lower shell includes an annular ridge disposed radially outwardly from said heat retention member, said ridge being fitted in said groove to seal the heat retention member in said cavity.

8. The server base of claim 7 wherein said upper shell includes an annular lip which forms a portion of said groove, said lower shell includes a shelf extending radially outwardly from said annular ridge, and wherein said annular lip overlaps said annular ridge and abuts said shelf to further seal the heat retention member in said cavity, while supporting the upper shell on the lower shell.

9. The server base of claim 8 wherein said annular ridge is fused in said groove and to said annular lip.

10. The server base of claim 1 wherein said shells hermetically seal said encapsulated heat retention medium.

11. The server base of claim 1 wherein said shells are molded from a plastic material.

12. The server base of claim 11 wherein said plastic material comprises a glass filled plastic material having a glass fiber content within a range from about 25 to about 35 percent by weight.

13. The server base of claim 12 wherein said plastic material comprises glass fiber filled nylon with a glass fiber content of about 27 percent by weight.

14. The server base of claim 1 including spacer means for spacing said base from another similar base when stacked together, to permit convective in addition to conductive heat transfer to said heat retention medium when heating the same.

15. The server base of claim 14 wherein said spacer means comprises a plurality of fins extending radially outwardly from the periphery of said base.

16. The server base of claim 1 including a side wall which forms a ledge for receiving a mating dome.

17. A heat retentive server comprising:
    a server base comprising:
        an upper shell and a lower shell, said shells sealing a cavity formed therebetween and forming a side wall having a ledge for receiving a mating dome; and
        a heat retention member disposed in said cavity, said heat retention member comprising an encapsulated heat retention medium, said medium being meltable to store heat therein when heated toward and above its melting point, and to release heat through said upper shell to maintain food or beverage supported above said upper shell warm as said melted heat retention material solidifies; and
    a dome adapted to be removably seated on said ledge.

18. The heat retentive server of claim 17 wherein said dome includes insulation material within its interior.

19. The heat retentive server of claim 17 wherein said dome exhibits a sealed interior space and comprises insulation material disposed within said interior space.

20. The heat retentive server of claim 19 wherein said heat retention medium comprises wax.

21. A dome for use in a heat retentive server to maintain food or beverage in a desired temperature range for a period of time, said dome comprising:
    an upper shell and a lower shell, said shells sealing a cavity formed therebetween; and
    a heat retention member disposed in said cavity, said heat retention member comprising an encapsulated heat retention medium, said medium being meltable to store heat therein when heated toward and above its melting point, and to release heat through said lower shell to maintain food or beverage supported below said lower shell warm as said melted heat retention material solidifies.

22. The dome of claim 21 wherein said heat retention medium comprises wax.

23. The dome of claim 21 wherein said shells are molded from a plastic material.

24. The dome of claim 23 wherein said plastic material comprises a glass filled plastic material having a glass fiber content within a range from about 25 to about 35 percent by weight.

25. The dome of claim 24 wherein said plastic material comprises glass fiber filled nylon with a glass fiber content of about 27 percent by weight.

26. A server base for use in a heat retentive server to maintain food or beverage in a desired temperature range for a period of time, said server base comprising:

a molded plastic upper shell and lower shell, said shells hermetically sealing a cavity formed therebetween; and a heat retention member disposed in said cavity, said heat retention member comprising wax encapsulated in a casing.

27. The server base of claim 26 wherein said casing is formed of a polyolefin material.

28. The server base of claim 26 wherein an upper surface of said base is configured to support dishware holding food whereby said base functions as a pellet base.

29. The server base of claim 26 wherein said upper and lower shells are joined along a welded seam.

30. The server base of claim 29 wherein said upper and lower shells are formed of a glass filled nylon material.

31. A server base for use in a heat retentive server to maintain food or beverage in a desired temperature range for a period of time, said server base comprising:

a molded plastic upper shell and lower shell, said shells hermetically sealing a cavity formed therebetween; and a disc shaped heat retention member disposed in said cavity, said heat retention member comprising a wax-filled casing wherein said casing encapsulates the wax.

32. The server base of claim 31 wherein said upper and lower shells are formed of a glass filled nylon material.

33. The server base of claim 32 wherein said upper and lower shells are joined along a welded seam.

34. A pellet meal delivery system for keeping food serving dishware warm for a period of time, said system including at least two pellet bases wherein each pellet base comprises:

a non-metallic upper shell and lower shell sealing a cavity formed therebetween, a heat retention member disposed in said cavity, and means extending radially outwardly from the periphery of each base for spacing said bases from one another when stacked to permit convective and conductive heat transfer to said heat retention member when heating said base.

35. The pellet meal delivery system of claim 24 wherein said spacer means forms the only contact between pellet bases when said bases are stacked one upon another.

36. The pellet meal delivery system of claim 35 wherein said spacer means maintains surfaces between adjacent pellet bases beyond said spacer means separated by at least 1/8 inch.

37. The pellet meal delivery system of claim 34 wherein each heat retention member comprises a wax filled disc wherein said disc encapsulates the wax.

38. The pellet meal delivery system of claim 34 wherein said spacer means comprises a plurality of fins extending radially outwardly from the periphery of each base.

39. The pellet meal delivery system of claim 38 wherein each base includes an inclined side wall extending upwardly and outwardly away from its upper and lower shells, said fins extending outwardly from the outer surface of each side wall, and each fin being configured to form a line contact with the inner surface of the side wall of the base placed thereunder.

40. The pellet meal delivery system of claim 38 wherein each heat retention member comprises a wax filled disc wherein said disc encapsulates the wax.

41. A server base for use in a heat retentive server to maintain food or beverage in a desired temperature range for a period of time, said server base comprising:

an upper shell and a lower shell, said shells being formed of a glass filled plastic material, said shells being joined to one another along a welded seam to define a sealed cavity therebetween, said seam including an annular groove formed in said upper shell and an annular ridge formed in said bottom shell and received in said annular groove; and a heat retention member disposed in said cavity, said heat retention member comprising an encapsulated heat retention medium, said medium being meltable to store heat therein when heated toward and above its melting point, and to release heat through said upper shell to maintain food or beverage supported above said upper shell warm as said melted heat retention material solidifies.

42. The server base of claim 41 wherein said heat retention medium comprises wax.

43. The server base of claim 41 wherein said glass filled plastic material is a glass filled nylon material.

44. The server base of claim 43 wherein said glass filled nylon material has a glass content from about 25 to 35 percent by weight.

45. The server base of claim 41 wherein said seam includes an annular lip on said upper shell forming a portion of said groove and a shelf on said lower shell extending radially outwardly from said annular ridge, said annular lip overlapping said annular ridge and abutting said shelf.

46. A method for making a server base having a cavity and a discrete phase change sealed core disposed therein comprising the steps of:

forming a casing with an inlet port;
supporting the casing with the inlet port directed upwardly;
filling the casing by flowing phase change material in its liquid state downwardly through the inlet port;
sealing off the inlet port so that said casing forms an encapsulation for said phase change material;
placing the encapsulated phase change material in a recess formed in a first shell;
assembling a second shell over the encapsulated phase change material; and
joining said first and second shells.

47. The method of claim 46 including the step of heating the casing to allow the casing to expand before filling the casing with the phase change material.

48. The method of claim 46 wherein the forming step comprises blow molding plastic to form the casing in the shape of a disc.

49. The method of claim 46 wherein the forming step comprises forming the inlet port as a nipple.

50. The method of claim 49 wherein said inlet port sealing step comprises crimping said nipple.

51. The method of claim 50 wherein said nipple is heated prior to the crimping thereof.

52. The method of claim 46 wherein the forming step comprises molding the casing to have a hole about its centroidal axis.

53. The method of claim 52 wherein the placing step comprises aligning said hole with a projection formed in the recess and placing the casing in the recess about the projection.

54. The method of claim 47 wherein said filling step includes filling the heated and expanded casing with sufficient phase change material so that in its solidified state the phase change material fills at least 97.5 percent by the volume of casing at ambient temperature.

55. The method of claim 54 wherein the filling step comprises filling the casing with wax.

56. The method of claim 46 wherein said joining step comprises ultrasonically welding said shells together.

57. A method for making a plurality of server bases each having a cavity and a discrete phase change sealed core disposed therein comprising the steps of:
   forming a plurality of casings while providing each with an inlet port;
   disposing each casing between plates removably supported in a fixture;
   heating the casing to allow the casing to expand;
   filling each heated and expanded casing by flowing phase change material in its liquid state downwardly through the inlet port with a sufficient amount of phase change material so that in its solidified state the phase change material fills at least 97.5 percent of the volume of the casing at ambient temperature;
   sealing off the inlet port;
   placing each filled and sealed casing in a recess formed in a first shell;
   assembling a second shell over each casing in each first shell; and
   joining said first and second shells.

58. The method of claim 57 wherein said casing is heated before being disposed in the fixture.

59. The method of claim 57 wherein said casing is heated after being disposed in the fixture.

* * * * *